United States Patent
Yang et al.

(10) Patent No.: US 12,241,167 B2
(45) Date of Patent: Mar. 4, 2025

(54) COMPOSITE MATERIALS

(71) Applicant: The University of Manchester, Manchester (GB)

(72) Inventors: Wenji Yang, Manchester (GB); Francis Moissinac, Manchester (GB); Suelen Barg, Manchester (GB); Jae Jong Byun, Manchester (GB)

(73) Assignee: THE UNIVERSITY OF MANCHESTER, Manchester (GB)

( * ) Notice: Subject to any disclaimer, the term of this patent is extended or adjusted under 35 U.S.C. 154(b) by 0 days.

(21) Appl. No.: 17/759,600

(22) PCT Filed: Jan. 28, 2021

(86) PCT No.: PCT/EP2021/052033
§ 371 (c)(1),
(2) Date: Jul. 27, 2022

(87) PCT Pub. No.: WO2021/152044
PCT Pub. Date: Aug. 5, 2021

(65) Prior Publication Data
US 2023/0055570 A1    Feb. 23, 2023

(30) Foreign Application Priority Data
Jan. 28, 2020  (GB) .................. 2001144

(51) Int. Cl.
*H01M 4/00*   (2006.01)
*C01B 32/19*  (2017.01)
(Continued)

(52) U.S. Cl.
CPC ............ *C25B 11/065* (2021.01); *C01B 32/19* (2017.08); *C01B 32/194* (2017.08);
(Continued)

(58) Field of Classification Search
CPC ...................................................... H01M 4/00
See application file for complete search history.

(56) References Cited

U.S. PATENT DOCUMENTS

| 7,071,258 B1 | 7/2006 | Jang et al. |
| 10,083,799 B2 | 9/2018 | Zhamu et al. |

(Continued)

FOREIGN PATENT DOCUMENTS

| CN | 105140046 A | 12/2015 |
| CN | 109201101 A | 1/2019 |

(Continued)

OTHER PUBLICATIONS

"Pt Nanoparticle-Loaded Graphene Aerogel Microspheres with Excellent Methanol Electro-Oxidation Performance", Miao He, Guoxia Fei, Zhuo Zheng, Zhengang Cheng, Zhanhua Wang, and Hesheng Xia, Langmuir 2019, 35, 3694-3700, (Year: 2019).*

(Continued)

*Primary Examiner* — Kelly M Gambetta
*Assistant Examiner* — Mohammad Mayy
(74) *Attorney, Agent, or Firm* — HAMILTON, BROOK, SMITH & REYNOLDS, P.C.

(57) ABSTRACT

The present invention relates to 2D-material based composite materials such as aerogels and particularly, although not exclusively, to deposition of nanoparticles on 2D-material based aerogels. Also described are methods for manufacturing such materials.

8 Claims, 7 Drawing Sheets

Immersion in ethanol    water infiltration    aqueous ion infiltration

(51) Int. Cl.
| | |
|---|---|
| C01B 32/194 | (2017.01) |
| C01B 32/198 | (2017.01) |
| C25B 11/031 | (2021.01) |
| C25B 11/065 | (2021.01) |
| C25B 11/077 | (2021.01) |
| C25B 11/081 | (2021.01) |
| C25D 5/18 | (2006.01) |
| C25D 9/04 | (2006.01) |
| H01M 4/92 | (2006.01) |

(52) U.S. Cl.
CPC .......... *C01B 32/198* (2017.08); *C25B 11/031* (2021.01); *C25B 11/077* (2021.01); *C25B 11/081* (2021.01); *C25D 5/18* (2013.01); *C25D 9/04* (2013.01); *H01M 4/926* (2013.01)

(56) References Cited

U.S. PATENT DOCUMENTS

| | | | |
|---|---|---|---|
| 10,903,020 | B2 | 1/2021 | Zhamu et al. |
| 11,447,880 | B2 | 9/2022 | Ejigu et al. |
| 2005/0271574 | A1 | 12/2005 | Jang et al. |
| 2009/0059474 | A1 | 3/2009 | Zhamu et al. |
| 2009/0061312 | A1 | 3/2009 | Zhamu et al. |
| 2010/0230298 | A1 | 9/2010 | Biener et al. |
| 2011/0157772 | A1 | 6/2011 | Zhamu et al. |
| 2011/0183180 | A1 | 7/2011 | Yu et al. |
| 2014/0107326 | A1 | 4/2014 | Swager et al. |
| 2015/0340170 | A1 | 11/2015 | Jun et al. |
| 2016/0236939 | A1 | 8/2016 | De Miguel Turullois et al. |
| 2016/0268061 | A1 | 9/2016 | Wang et al. |
| 2017/0062141 | A1 | 3/2017 | Zhamu et al. |
| 2017/0096548 | A1* | 4/2017 | Kim ............. C01B 33/155 |
| 2017/0233255 | A1 | 8/2017 | Zhamu et al. |
| 2018/0190439 | A1 | 7/2018 | Zhamu et al. |
| 2018/0290891 | A1 | 10/2018 | Gong et al. |
| 2018/0330893 | A1 | 11/2018 | Zhamu et al. |
| 2019/0264337 | A1 | 8/2019 | Dryfe et al. |
| 2019/0301814 | A1 | 10/2019 | Lin et al. |
| 2021/0108317 | A1 | 4/2021 | Ejigu et al. |

FOREIGN PATENT DOCUMENTS

| | | |
|---|---|---|
| CN | 109300701 A | 2/2019 |
| JP | 07-207450 A | 8/1995 |
| JP | 2019-521477 A | 7/2019 |
| WO | 2015/158703 A1 | 10/2015 |
| WO | 2015/158711 A1 | 10/2015 |
| WO | 2017/050689 A1 | 3/2017 |
| WO | 2017/060433 A1 | 4/2017 |
| WO | 2017182860 A1 | 10/2017 |
| WO | 2019/122379 A1 | 6/2019 |
| WO | 2021/152044 A1 | 8/2021 |

OTHER PUBLICATIONS

"3D ternary nanocomposites of molybdenum disulfide/polyaniline/reduced graphene oxide aerogel for high performance supercapacitors", Chuhan Sha, Bin Lu a, Carbon, vol. 99, April, pp. 26-34 (Year: 2016).*
Acharya Udit et al., Synergistic conductivity increase in polypyrrole/molybdenum disulfide composite, Jul. 3, 2018, Polymer, Elsevier, Amsterdam, NL, 130-137, 150.
Bi Lili et al., Compressible AgNWs/Ti 3 C 2 T x MXene aerogel-based highly sensitive piezoresistive pressure sensor as versatile electronic skins, Jan. 1, 2020, Journal of Materials Chemistry A, 20030-20036, 8(38).
Sha Chuhan et al., 3D ternary nanocomposites of molybdenum disulfide/polyaniline/reduced graphene oxide aerogel for high performance supercapacitors, Dec. 2, 2015, Carbon, Elsevier Oxford, GB, 26-34, 99.
Yang Cuizhen et al., Three dimensional MXenes (Ti3C2TX)/graphene hybrid aerogel supported Pt nanoparticles for electrocatalysts of direct methanol fuel cells, May 10, 2019, 2nd International Conference on MXenes, 1-206, https://research.coe.drexel.edu/mse/nanomaterials/wpcontent/uploads/2019/05/2nd-International-Conference-on-MXenes-Proceedings.pdf, Mar. 13, 2024.
Cooper et al., Single stage electrochemical exfoliation method for the production of few-layer graphene via intercalation of tetraalkylammonium cations, Science Direct, 340-350, Carbon 66 (2014).
Great Britain Search Report for GB Application No. 1721817.3, Date of Search: Jul. 30, 2018.
International Search Report and Written Opinion for Int'l Application No. PCT/EP2018/086698, Date Mailed: Mar. 25, 2019.
Nguyen et al., Electrochemistry of ruthenium dioxide composite electrodes in diethylmethylammonium-triflate protic ionic liquid and its mixtures with acetonitrile, Electrochimica Acta, 96-103, 147 (2014).
Parvez, Exfoliation of Graphite into Graphene in Aqueous Solutions of Inorganic Salts, Mar. 31, 2014, Journal of the American Chemical Society, 6083-6091, 136(16).
Shen et al., Carbon encapsulated RuO2 nano-dots anchoring on graphene as an electrode for asymmetric supercapacitors with ultralong cycle life in an ionic liquid electrolyte, Journal of Materials Chemistry A, 8180-8189, 4 (2016).
Stoller et al., Best practice methods for determining an electrode material's performance for ultracapacitors, Energy and Environ. Sci., 1294-1301, 3 (2010).
Wu et al., Anchoring Hydrous RuO2 on Graphene Sheets for High-Performance Electrochemical Capacitors, Adv. Funct. Mater., 3595-3602, 20 (2010).
Puskelova et al. "Photocatalytic hydrogen production using TiO2—Pt aerogels" Chemical Engineering Journal 242 (2014) 96-101.
Cheng et al. "Platinum single-atom and cluster catalysis of the hydrogen evolution reaction" Nature Communications, 7: 13638 (2016).
Cui et al. "Fast assembly of Ag3PO4 nanoparticles within three-dimensional graphene aerogels for efficient photocatalytic oxygen evolution from water splitting under visible light" Applied Catalysis B: Environmental 200 (2017) 666-672.
Nawaz et al. "One-step hydrothermal synthesis of porous 3D reduced graphene oxide/TiO2 aerogel for carbamazepine photodegradation in aqueous solution" Applied Catalysis B: Environmental 203 (2017) 85-95.
Dubey et al. "Synthesis of graphene-carbon sphere hybrid aerogel with silver nanoparticles and its catalytic and adsorption applications" Chemical Engineering Journal 244 (2014) 160-167.
Zafra et al. "A novel method for metal oxide deposition on carbon aerogels with potential application in capacitive deionization of saline water" Electrochimica Acta (2014) 135:208-216.
Wu et al. "A self-assembly route to porous polyaniline/reduced graphene oxide composite materials with molecular-level uniformity for high-performance supercapacitors" Energy Environ. Sci. 2018, 11, 1280.
Mao et al. "Preparation of Polyaniline-coated Composite Aerogel of MnO2 and Reduced Graphene Oxide for High-performance Zinc-ion Battery" Chinese J. Polym. Sci. 2020, 38, 514-521.
Wang et al. "Construction and Application of nanocellulose/graphene/MnO2 three-dimensional composites as potential electrode materials for supercapacitors" Journal of Materials Science: Materials in Electronics (2020) 31:1236-1246.
Wang et al. "Manganese Oxide/Graphene Aerogel Composites as an Outstanding Supercapacitor Electrode Material" Chem Eur. J. 2014, 20, 517-523.
Zhao et al. "Three-dimensional graphene/Pt nanoparticle composites as freestanding anode for enhancing performance of microbial fuel cells" Sci. Adv. 2015;1:e1500372, 1-8.
Harley-Trochimczyk et al. "Catalytic hydrogen sensing using microheated platinum nanonparticle-loaded graphene aerogel" Sensors and Actuators B:206 (2015) 399-406.
Yang et al. "Enhanced visible-light photocatalytic performance of a monolithic tungsten oxide/graphene oxide aerorgel for nitric oxide oxidation" Chinese Journal of Catalysis 39 (2018) 646-653.

(56) References Cited

OTHER PUBLICATIONS

International Search Report and Written Opinion for Int'l Application No. PCT/EP2021/052033, titled: Composite Materials, Date Mailed: Apr. 6, 2021.

Puskelova et al. "Photocatalytic hydrogen production using TiO2-Pt aerogels" Chemical Engineering Journal 242 (2104) 96-101.

Han et al. "A Graphitic-C3N3 "Seaweed" Architecture for Enhanced Hydrogen Evolution" Angew. Chem. Int. Ed. 2015, 54, 11433-11437.

Cheng et al. "Platinum single-atom and cluster catalysis of the hydrogen evolution" Nature Communications, 7: 13638 (2016).

Cui et al. "Fast assembly of Ag3PO4 nanoparticles within three-dimensional graphene aerogels for efficient photocatalyic evolution from water splitting under visible light" Applied Catalysis B: Environmental 200 (2017) 666-672.

Nawaz et al. "One-step hydrothermal synthesis of porous 3D reduced graphene oxide/TiO2 aerogel for carbamazephine photodegradiation in aqueous solution" Applied Caralsis B: Environmental 203 (2017) 85-95.

Lu et al. "High activity of hot electrons from bulk 3D graphene materials for efficient photocatalytic hydrogen production" Nano Research 2017, 10(5): 1662-1672.

Dubey et al. "Synthesis of graphene-carbon sphene hybrid aerogel with silver nanoparticles and its catalytic and adsorption applications" Chemical Engineering Journal 244 (2014) 160-167.

Zafra et al. "A novel method for metal oxide deposition on carbon aerogels with potential application in capacitive deionization of saline water" Electrocimica Acta (2014) 135:208-216.

Oztuna et al. "Graphene Aerogel Supported Pt Electrocatalysts for Oxygen Reduction Reaction by Supercritical Deposition" Electrochimica Acta, 250 (2017), 174-184.

Wu et al. "A self-asesmbly route to porous polyaniline/reduced graphene composite materials with molecular-level uniformity for high-performance supercapacitors" Energy Environ. 2018, 11, 1280.

Mao et al. "Preparation of Polyaniline-coated Composite Aerogel of MnO2 and Reduced Graphene Oxide for High-performance Zinc-ion Battery" Polym. Sci. 2020, 38, 514-521.

Wang et al. "Construction and Application of nanocellulouse/graphene/MnO2 three-dimensional composites as potential electrode materials for supercapacitors" Journal of Materials Science: Materials in Electronics (2020) 31:1236-1246.

Wang et al. "Manganese Oxide/Graphene Aerogel Composites as an Outstanding Supercapacitor Electrode Mateiral" Chem. Eur. J. 2014, 20, 517-523.

Zhao et al. "Three-dimensional graphene/Pt nanoparticle composites as freestanding anode for enhancing performance of microbial fuel cells" Adv. 2015;1:e1500372, 1-8.

Harley-Trochimcyzk et al. "Catalytic hydrogen sensing using microheated platinum nanoparticle-loaded graphene aerogel" Sensors and Actuators B:206 (2015) 399-406.

Yang et al. "Enhanced visible-light photocatalytic performance of a monolithic tungsten oxide/graphene oxide aerogel for nitric oxidation" Chinese Journal of Catalysis 39 (2018) 646-653.

International Search Report and Written Opinion for Int'l Application No. PCT/EP2021/052033, titled: Composite Materials, Dated Mailed: Apr. 6, 2021.

Chigane et al., Manganese Oxide Thin Film Preparation by Potentiostatic Electrolyses and Electrochromism, Journal of The Electrochemical Society, 2246-2251, 147 (6) (2000).

Cooper et al., Single stage electrochemical exofoliation method for the production of few-layer graphene via intercalation of tetraalktlammonium cations, Science Direct, 340-350, Carbon 66(2014).

Dizaji et al., One-step Electrochemical Synthesis of Graphene/Metal Particle Nanocomposite, Chemistry and Chemical Engineering Research Center of Iran, Tehran, Iran (2016), 1-3.

Great Britain Search Report for GB Application No. 172817.3, Date of Search: Jul. 30, 2018.

International Search Report and Written Opinion for Int'l Application No. PCT/EP2018/086698, Dated Mailed: Mar. 25, 2019.

Nguyen et al., Electrochemistry of ruthenium dioxide composite electrodes in diethylmethylammonium-triflate protic ionic and its mixtures with acetonitrile, Electrochimica Acta, 96-103, 147 (2014).

Parvez, Exfoliation of Graphite into Graphene in Aqeuous Solutions of Inorganic Salts, Mar. 31, 2014, Journal of the American Chemical Society, 6083-6091, 136(16).

Shen, et al., Carbon encapsulated RuO2 nano-dots anchroing on graphene as an electrode for asymmetric supercapacitors with ultralong cycle life in an ionic liquid electrolyte, Journal of Mateirals Chemistry A, 8180-8189, 4 (2016).

Stoller et al. Best practice methods for determining an electrode material's performance for ultracapacitors, Energy and Envrion. Sci., 1294-1301 (2010).

Wu et al., Anchroing Hydrous RuO2 on Graphene Sheets for High-Performance Electrochemical Capacitors, Adv. Funct. Mater., 3595-3602, 20 (2010).

Zhang et al., Protic Ionic Liquids and Salts as Versatile Carbon Precursors, ournal of The American Chemical Society, 1690-1693, 136 (2014).

Acharya Udit et al., Synergistic conductivity increase in polypyrrole/molybenum disulfide composite, Jul. 3, 2018, Polymer, Elsevier, Amsterdam, NL, 130-137, 150.

Bi Lili et al., Compressible AgNWs/Ti 3 C 2 T x MXene aerogel-based highly sensitive piezoresistive pressure sensor as versatile electronic skins, Jan. 1, 2020, Journal of Mateirals Chemistry A, 20030-20036, 8(38).

Sha Chuhan et al., 3D ternary nanocomposites of molybenum disulfate/polyaniline/reduced graphene oxide aerogel for high performance supercapacitors, Dec. 2, 2015, Carbon, Elsevier, Oxford, GB, 26-34, 99.

Yang Cuizhen et al., Three dimensional MXenes (Ti3C2TX)/graphene hybrid aerogel supported Pt nanoparticles for electrocalysts of direct methanol fuel cells, May 10, 2019, 2nd International Conference on MXenes, 1-206, https://research.coe.drexel.edu/nse/nanomaterials/wpcontent/uploads/2019/05/2nd-International-Conference-on-MXenes-Proceedings.pdf, Mar. 13, 2024.

* cited by examiner

A) HAADF-STEM image of particles for mapping. Element mapping images of C, O, Pt with their overlapping images. B) STEM line scan, mapping size of single atom of Platinum

COMPOSITE MATERIALS

This application is the U.S. National Stage of International Application No. PCT/EP2021/052033, filed Jan. 28, 2021, which designates the U.S., published in English, and claims priority under 35 U.S.C. § 119 or 365 (c) to Great Britain Application No. 2001144.1, filed Jan. 28, 2020. The entire teachings of the above applications are incorporated herein by reference.

FIELD OF THE INVENTION

The present invention relates to 2D-material based composite materials such as aerogels and particularly, although not exclusively, to deposition of nanoparticles on 2D-material based aerogels. Also described are methods for manufacturing such materials.

BACKGROUND

The morphology, size, placement and stability of deposited materials can have a strong influence on their properties. The ability to deposit useful materials onto a three-dimensional material, which itself has interesting properties, leads to valuable composite materials with unique combinations of properties.

Control of this deposition is also desirable. For example reducing the size of a metal catalyst to miniscule particles on supports is an efficient approach to expose more catalytic active sites as it maximizes the amount of the catalytically active species within the limited surface area. The epitome in metal utilisation is to engineer single metal atoms on appropriate supports to reduce the overall metal loading needed for catalysis, whilst improving the efficiency and selectivity of reactions. The reasoning behind this is the low coordination nature of a single metal atom which potentially induces high chemical activities, as long as these sites can be rendered active for extended durations.

The high cost and natural scarcity of some metal catalysts, such as platinum, limit their large-scale use. Several attempts have been made to prepare single-atom catalysts (SACs) to minimize the amount of metal required to catalyse reactions efficiently. These attempts, however, still have much room for improvement.

In *Nature Communications.* 7, Article number: 13638 (2016), single Pt atoms are deposited on nitrogen doped graphene nanosheets by atom layer deposition. The single atom platinum catalysts were used in the hydrogen evolution reaction (HER).

*Chemical Engineering Journal,* 244 (2014) 160-167 describes the synthesis of graphene-carbon sphere hybrid aerogel with silver nanoparticles and its catalytic and adsorption applications.

Nano Research, 2017, 10(5), 1662-1672 describes synthesis of three-dimensionally cross-linked graphene/$TiO_2$ composite by mixing titanium tetraisopropoxide with graphene, water and ethanol in a top-down approach. The titanium must be added before the formation of the three-dimensional material.

*Applied Catalysis B: Environmental,* 201 (2017) 85-95 describes a one-step hydrothermal synthesis of porous 3D reduced graphene oxide/$TiO_2$ aerogel for carbamazepine photodegradation in aqueous solution. Once again, the titanium must be added before the formation of the three-dimensional material.

*Chemical Engineering Journal,* 242 (2014) 96-101 describes the synthesis of $TiO_2$-Pt aerogels by immersing $TiO_2$ gels in Pt colloidal solutions and drying the gels in carbon dioxide under pressure and heat.

*Angew. Chem. Int. Ed.* 2015, 54, 11433-11437 uses freeze casting assembly with dicyandiamide to form a graphitic-$C_3N_4$ foam followed by hydrothermal reduction.

*Applied Catalysis B: Environmental,* 200 (2017) 666-672 forms $Ag_3NO_3$ nano particles within three-dimensional graphene aerogels by a facile in situ ion filtration-precipitation method followed by freeze drying.

*Electrochimica Acta,* 135 (2014) 208-216 describes a sol-gel method for making an aerogel having $Fe_3O_4$ and MnO deposits. Such methods form the aerogel 'concurrently' with deposition: there is no deposition on a pre-existing aerogel material, or specific deposition step. The TEM images provided demonstrate very little dispersion of the active materials. The sol-gel method does not allow control of deposition distribution or amount, meaning a lack of homogeneity. Where active material is deposited, it is in relatively large agglomerations.

*Energy Environ. Sci,* 2018, 11, 1280 describes another sol-gel deposition method. The sol-gel created product is of active materials PANI and $MnO_2$ on a reduced graphene oxide aerogel. As mentioned above, the sol-gel synthesis method does not allow deposition on an existing aerogel. Nor is there control of active material deposition distribution or amount, leading to a non-homogenous distribution of active materials. Relatively large agglomerations of active material are formed, with no way to control deposition amount.

*Chinese J. Polym. Sci.,* 2020, 38, 514521 describes a further sol-gel synthesis method. It suffers the same problems as mentioned above: with no possible way to control where and how much active material is deposited, the products do not display homogenous deposition and where deposition occurs there are relatively large agglomerations rather than, for example, single atoms.

*Journal of Materials Science. Materials in Electronics,* (2020) 31:1236-1246 describes a procedure wherein graphene oxide, carbon nanofiber slurry and $MnO_2$ are mixed, transferred to an autoclave and then heated to form a graphene/nanocellulose/$MnO_2$ hydrogel. Freeze-drying and carbonization forms a graphene/nanocellulose/$MnO_2$ aerogel. Much like the sol-gel methods mentioned above, this technique mixes all precursors together before aerogel synthesis. No pre-existing aerogel is used (or could be used). It is also apparent that there is no control of where, or how much, $MnO_2$ is deposited/present on the various parts of the resultant aerogel. No homogeneity can be observed or assumed based on the method and images provided. It seems that larger $MnO_2$ deposits are formed.

US20100230298 describes an electrochemically driveable actuator including a nanoporous carbon aerogel composition.

WO2017182860 describes a method for producing simultaneously in an aqueous medium two distinct populations of nanomaterials, for example based on graphene, with capacitive properties, electrolytic properties and different and adjustable redox properties.

US20150340170 describes a three-dimensional graphene composite made by electrodepositing nanoparticles onto the surface of graphene foam.

CN105140046A describes preparation of a manganese dioxide/graphene composite material by stirring a graphene aerogel with manganese salt in water.

CN109201101A describes preparation of porous nitrogen doped graphene aerogel with large surface area and preparation of nanoclusters of gold with nitrogen-doped graphene aerogel as a precursor.

There remains a need to develop techniques which enable the controlled deposition of useful materials onto 2D-material based aerogels.

The present invention has been devised in light of the above considerations.

SUMMARY OF THE INVENTION

The present inventors have considered a porous 2D-material based matrix with high electrical conductivity, good mechanical stability and confined microenvironment to be an ideal platform to stabilise isolated atom and molecule centres for many uses including electrocatalysis, super capacitors, gas sensors, optical catalysis and chemical sensors. However the hydrophobic nature of graphene and other 2D-material based aerogels has made it difficult to load platinum on aerogels via a wet approach.

The present inventors have devised a method to deposit a variety of different metals or materials onto a 2D-material based aerogel in a controllable manner. This control means that the deposition can be performed reliably and evenly across the entire surface of the aerogel. That is, deposition may be uniform, and may be on the whole aerogel surface, if desired. This homogeneity of deposition allows, as explained below, for more efficient utilisation of the properties of the deposited material.

In general the prior syntheses of decorated aerogels rely on the pre-mixing of the materials (e.g. using a sol-gel synthesis method) or chemical modification of the 2D-material to enhance the stability of the deposited material.

As is known, the corner and edge sites of catalysts often possess a superior activity. Inspired by this, the present inventors use highly curved supports to anchor single metal sites with to mimic metal sites at the corners and edges of particles. The distribution of metallic single atoms on 2D-material based aerogels can produce highly efficient catalysts suitable for many reactions, for example hydrogen evolution, oxygen reduction reaction, carbon sequestration, or reduction of carbon dioxide to methanol/methane.

Discussed herein is a method for producing a composite material. Saturating a 2D-material based aerogel with an impregnation solvent followed by washing with water induces a solvent swap or exchange, which enables diffusion of an electrolyte into the aerogel. Electrolysis, wherein one electrode is comprised of the aerogel impregnated with electrolyte, leads to homogeneous deposition of a metal or other material onto the aerogel surface. Pulse electrodeposition allows control over the size and level or extent of the deposition, enabling deposition of single atoms or molecules as well as deposition of nanoparticles depending on what may be required. Alternatively, the present invention may be used to deposit material layers of a predetermined, controlled thickness onto the surface of pores of the aerogel.

Accordingly, the present invention can provide an aerogel with deposition material homogeneously deposited within its structure. The present invention also provides aerogels with small, for example single or up to 10 atom/molecule, deposition sites. Each deposition site presents a significant deposit surface area, meaning the present products can more effectively present the deposition materials.

This approach enables a divergent synthesis of composite materials wherein many varieties may be synthesised from the same starting 2D-material based aerogel depending on what electrodeposition precursor is selected as the electrolyte. This approach also enables homogenous deposition of the material onto the surface of the pores of the aerogel (that is, into the pores). In other words, the deposition of the material may be evenly spread throughout the internal and external surface of the aerogel. The distribution of the deposited material may be substantially uniform or even on and/or in the aerogel. Such aerogels having a material deposited on them are aspects of the present invention.

This approach also provides a scalable synthesis of these composite materials.

In a first aspect, the invention may provide a method for producing a composite material, comprising the steps of (a) impregnating a 2D-material based aerogel with an impregnation solvent, to form a solvent impregnated aerogel, (b) performing a solvent/water exchange by washing the solvent impregnated aerogel with water, to replace impregnation solvent with water and form a water impregnated aerogel, (c) performing precursor diffusion by contacting the water impregnated aerogel with an electrolyte solution containing a deposition precursor, to form a precursor impregnated aerogel, and (d) passing a current through a cell comprising the precursor impregnated aerogel as a working electrode.

In some embodiments the 2D-material based aerogel is selected from a graphene aerogel, graphene oxide aerogel, a reduced graphene oxide aerogel, a carbide aerogel, a transition metal dichalcogenide aerogel, and an MXene aerogel (for example a metal carbide or metal nitride MXene aerogel).

In some embodiments the impregnation solvent is selected from methanol, ethanol, 1-propanol, isopropanol, n-butanol, formic acid, acetone, dimethylformamide and dimethylsulfoxide. These are polar solvents which are miscible with water which can promote the solvent swap in step (b).

In some embodiments the electrolyte solution is aqueous.

In some embodiments the deposition precursor is a salt.

In some embodiments the deposition precursor is selected from a salt of platinum, a salt of manganese, a salt of silver, a salt of tungsten, a salt of copper, aniline and pyrrole.

In some embodiments the deposition precursor is selected from chloroplatinic acid, manganese acetate, silver nitrate, sodium tungstate dehydrate, lithium perchlorate/copper sulfate, hydrogen tetrachloroaurate(III), tetraamminepalladium (II) chloride monohydrate, aniline and pyrrole.

In some embodiments the current is passed in pulses. This enables controlled deposition of, for example, single atoms or molecules.

The present invention therefore also provides aerogels with the deposition materials (modifying agents) discussed herein deposited as single atoms or molecules.

In a further aspect, the invention provides a composite material produced by the method set out in the first aspect.

In a further aspect, the invention provides a composite material, comprising a 2D-material based aerogel and a modifying agent homogeneously dispersed on the surface of the pores in the aerogel.

The modifying agent may preferably be deposited or substantially deposited as single atoms or molecules. At least some of the deposited material may be deposited as single atoms or molecules. For example, greater than 50% by mass of the deposited agent may be in the form of single atoms or molecules. In some embodiments it may be, for example, 75% or greater, or even 90% or greater, by mass of the deposited agent which is in the form of discrete single atoms or molecules deposited on/in the aerogel.

Alternatively or additionally, the single atoms may be assessed numerically as a percentage of the total number of deposits present. So, for a given discrete deposit, it can be classified as 'single atom/molecule' or 'non-single or multiple atom/molecule'. It may be preferable for there to be more deposits which are 'single atom/molecule' than are 'non-single or multiple atom/molecule'. That is, greater than 50% of deposit sites are single atom/molecule. In some embodiments it may be 75% or greater, or even 90% or greater.

These can be assessed by, for example, analysis of HAADF-STEM images as shown in FIG. 5. An assessment can be done by, for example, taking 10 specimens (2 μm×2 μm×2 μm) of the aerogel at random and analysing HAADF-STEM images of each. These specimens can be taken as representative of the material as a whole.

Aerogel deposits can be analysed in a number of other ways.

Materials characterisation carried out to determine elemental and bonding analysis. Suitable techniques include Raman spectroscopy, X-ray photoelectron spectroscopy (XPS), and X-ray diffraction crystallography (XRD). Such analyses can tell us what materials are present and how they are attached to the aerogel.

X-ray computed tomography (XCT) can be used to image a broader view of the aerogel surface, for example to examine homogeneity of deposition within the aerogel.

Scanning electron microscopy (SEM) can be used to determine or perform structure analysis of the aerogel. It is ideal for imaging deposits which are nanoparticles (anything larger than a few, for example 2, nanometres). It allows observation of these particles and hence determination of their number and size.

Transmission electron microscopy (TEM) is currently the leading way to assess the presence of single atoms. As illustrated in the figures of TEM scans and HAADF-STEM, a TEM offers the level of resolution required to observe a single atom. Using such analyses the number and distribution of single atom deposition can be assessed.

Accordingly, in a further aspect the invention provides a composite material, comprising a 2D-material based aerogel and a modifying agent dispersed on the surface of the pores in the aerogel, wherein the modifying agent is in the form of single atoms or molecules. This is not to say that 100% of the modifying agent present must be single atoms; it is sufficient that at least some is. As explained above, it may be preferable for the modifying agent to be substantially present in the form of single atoms or molecules.

Where multiple modifying agents are present, one of them may be present substantially as single atoms or molecules and the other(s) not. In certain embodiments, all modifying agents present are substantially present as single atoms/molecules as explained and defined above.

In some embodiments the 2D-material based aerogel is selected from a graphene aerogel, a graphene oxide aerogel, a reduced graphene oxide aerogel, a carbide aerogel, and a transition metal dichalcogenide aerogel.

In some embodiments the modifying agent is selected from platinum, manganese oxide, silver, tungsten oxide, copper, polyaniline and polypyrrole.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1:
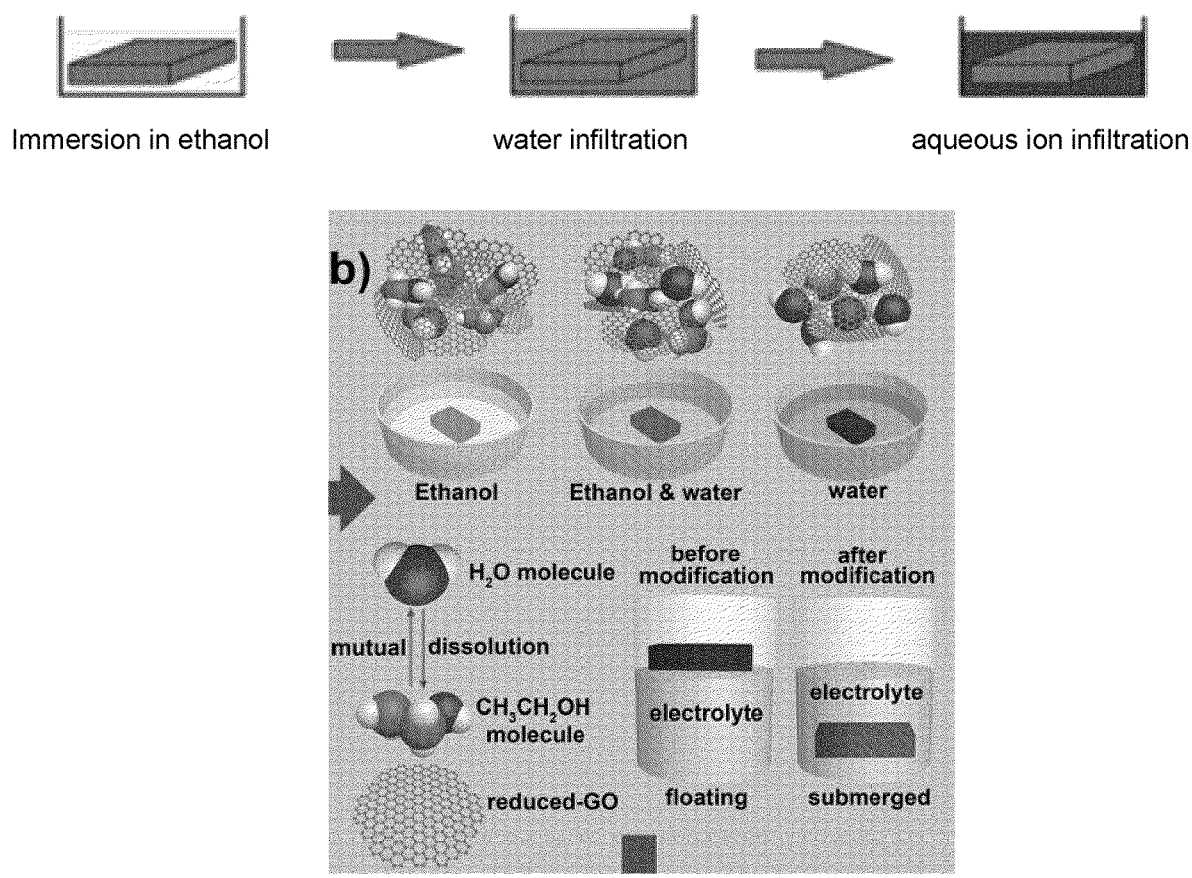
FIG. 1 shows the sequential submerging of the aerogel in a solvent, then water, then an aqueous ion solution.

Aspects and embodiments of the present invention will now be discussed with reference to the accompanying figures. Further aspects and embodiments will be apparent to those skilled in the art. All documents mentioned in this text are incorporated herein by reference.

The present invention utilises aerogels, also known as foams. Aerogels are gels comprised of a microporous solid in which the dispersed phase is a gas. 2D-material based aerogels are known in the art.

In the present invention a 2D-material based aerogel is impregnated with a polar solvent. Then the solvent saturated 2D-material based aerogel is subjected to a solvent swap or exchange with water. This creates a 2D-material based aerogel that is saturated with water. Such a material has not been obtainable in the past. Then, the 2D-material based aerogel is imbued with an ionic solution enabling the 2D-material based aerogel to be saturated with the ionic solution by ionic diffusion into the water within the aerogel. Deposition of material onto the 2D-material based aerogel may then be achieved by electrodeposition wherein one electrode is the 2D-material based aerogel saturated with ionic solution.

The 2D-material based aerogel can be made from any known 2D-material (in aerogel form). Suitably the 2D material is electrically conductive. Preferably the 2D-material is selected from graphene, graphene oxide, reduced graphene oxide, MXenes such as carbides, for example titanium carbide, or transition metal dichalcogenides. In other words, the 2D-material based aerogel may be a graphene aerogel, a graphene oxide aerogel, a reduced graphene oxide aerogel, an aerogel of an MXene such as a carbide or an aerogel of a transition metal dichalcogenide. Suitably it is a graphene aerogel or reduced graphene oxide aerogel. It is known in the art that reduced graphene oxide (rGO) is graphene produced via the reduction of graphene oxide (GO).

The 2D-material based aerogel can be manufactured using any known technique. Such techniques are known to a person skilled in the art and include hydrothermal/solvothermal reduction, sol-gel, freeze gelation, chemical reduction, cross-linking methods, 3D printing, CVD synthesis, and templated methods such as ice templated methods. Preferably, the aerogel is manufactured by ice templating.

Where a graphene oxide aerogel is used, the present methods may include a step of reducing that aerogel to form a reduced graphene oxide aerogel.

Once the aerogel is obtained, it is impregnated with an impregnation solvent. That is, pores of the aerogel are substantially filled with an impregnation solvent. This may be achieved by, for example, submerging the aerogel in the solvent or repeated washing, dipping, or other processes. It will be understood that the impregnation solvent is a solvent able to enter the structure of the aerogel. Water cannot be used because of the hydrophobicity of the structure. Accordingly the impregnation solvent is not water.

The impregnation solvent is suitably a solvent which is miscible with water to facilitate solvent exchange and is suitably a solvent with a 25° C. n-octanol/water partition coefficient (log P) of less than 1, for example less than 0.5, less than 0, or less than −0.5. log P may be calculated using, for example, a known method such as the shake-flask method, following a method such as OECD Test No. 107 (adopted 27 Jul. 1995) with analysis by gas-liquid chromatography.

That is, the impregnation solvent may suitably be any solvent which does not form a phase boundary with water and is capable of fully mixing with water to form a homogeneous solution at any proportion. The impregnation solvent is suitably a polar solvent, for example dimethyl sulfoxide, or an organic solvent known in the art. That is, any solvent which is soluble and/or miscible in water, such as dimethylformamide, dimethyl sulfoxide or a polar protic solvent. Preferably the impregnation solvent is a polar protic organic solvent. More preferably the impregnation solvent is an alcohol, for example methanol, ethanol, 1-propanol, isopropanol, or n-butanol. In some cases the impregnation solvent is ethanol. This first impregnation enables, in a later step, water to permeate the aerogel. Without this first soaking, the inherent hydrophobicity of the aerogel prohibits water based solutions from infiltrating the aerogel.

This impregnation solvent is suitably free of water, but may include a small amount. Suitably the content of water in this impregnation solvent is less than 20% v/v, preferably less than 10% v/v, and more preferably less than 5% v/v.

Figure 6:
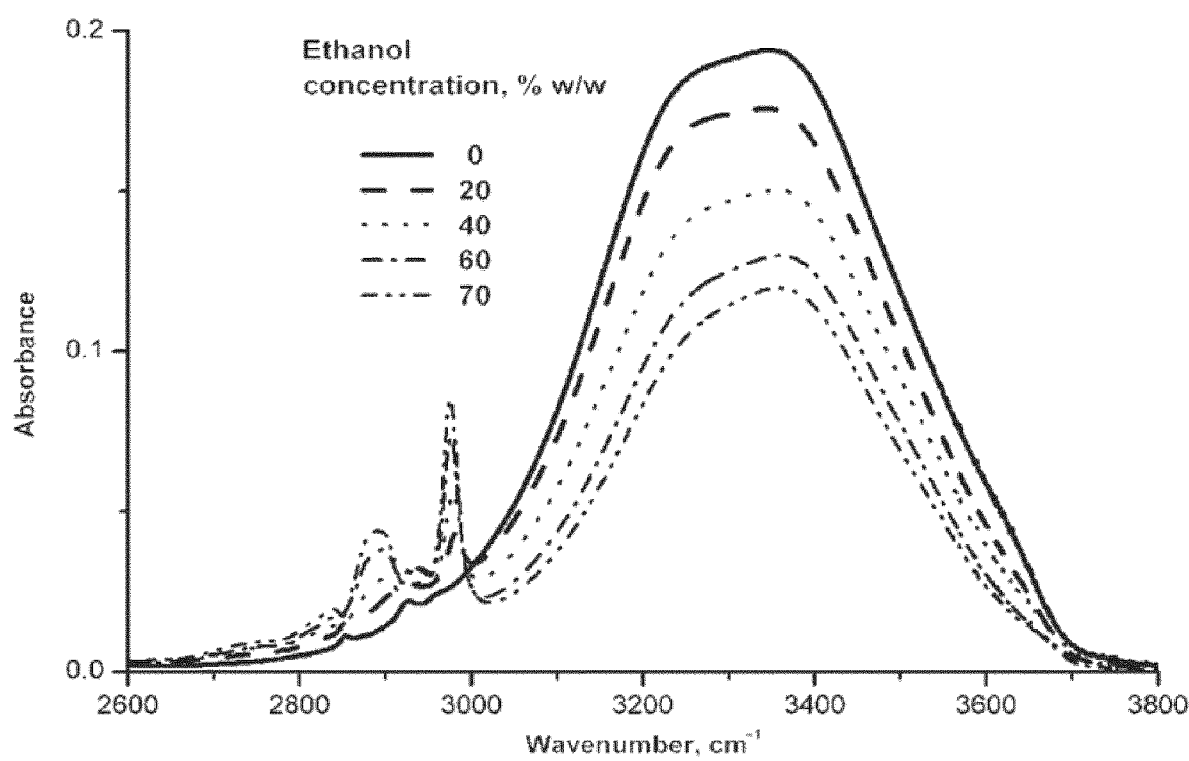
FIG. 6 shows the IR absorption spectra of water and ethanol solutions within region of CH and OH stretching bands.

The impregnation solvent soaked aerogel is then washed with water, preferably deionised water. Washing the aerogel may suitably be carried out by submerging the aerogel in the water, removing the aerogel and submerging in water again. Preferably fresh, clean water is used for each wash. The water may alternatively be dropped or poured over the aerogel. This process can be repeated until the impregnation solvent in the aerogel has been at least partially replaced by water. In preferred embodiments, the impregnation solvent is mostly or substantially replaced with water; in some embodiments, it may be entirely replaced with water. The point at which the impregnation solvent has been replaced by water can be determined by eye, using observable variations in refraction of light through the solution that is washed off the aerogel, or, suitably, the solution run off can be monitored by IR absorption spectroscopy (FIG. 6). In that Figure the impregnation solvent is ethanol. As the ethanol is replaced with water the IR spectrum of the solution run off will approach that of the solid black line of FIG. 6, where ethanol concentration is 0 w/w %. In suitable embodiments washing is continued until the solution run off is 20% w/w impregnation solvent, for example ethanol, or less, for example 10% w/w or less, 5% w/w or less, 2% w/w or less or 1% w/w or less. A suitable number of washes is 4 to 8. The miscibility of the impregnation solvent with water enables infiltration of water into the pores of aerogel. Over the course of the washes the proportion of water increases until there is no longer impregnation solvent present. After washing with water, pores of the aerogel are occupied with water.

The water soaked aerogel is then infiltrated with an electrolyte solution, suitably by submerging the aerogel in the electrolyte solution, also known as the precursor solution. The presence of the water within the aerogel enables the electrolyte/precursor in the electrolyte solution or the ions therein to infiltrate the pores of the aerogel by diffusion. The electrolyte solution is a solvent (for example water) and at least one electrolyte (that is, at least one deposition precursor) and may be selected based on the desired material to be deposited onto the aerogel. Such deposition precursors are known in the art. It will be appreciated that more than one deposition precursor may be present in the electrolyte solution to facilitate mixed deposition. In some embodiments, only a single deposition precursor is present.

The or a deposition precursor may suitably be ionic, for example it may be or comprise a salt containing palladium, ruthernium, rhodium, platinum, manganese, silver, tungsten, gold, copper, nickel, aluminium, calcium, or an oxide or oxides thereof.

For example, use of tetraamminepalladium(II) chloride monohydrate results in deposition of palladium, use of chloroplatinic acid results in deposition of platinum, use of manganese acetate results in deposition of manganese oxide, use of silver nitrate results in deposition of silver, use of sodium tungstate dehydrate results in deposition of tungsten oxide, use of hydrogen tetrachloroaurate(III) results in deposition of gold, use of nickel sulfate results in the deposition of nickel, use of lithium perchlorate with copper sulphate results in deposition of copper, use of aluminium sulfate with sodium thiosulfate results in deposition of aluminium oxide, and use of calcium nitrate with sodium bicarbonate results in deposition of calcium oxide.

The or a deposition precursor may suitably be or comprise a polymer precursor which undergoes polymerisation upon oxidation, such as aniline, pyrrole, 3-hexylthiophene or 3-thiophene acetic acid (3-TAA). Or the or a deposition precursor may be phenyl-C61-butyric acid methyl ester (PCBM).

For example, use of polymer precursors such as aniline, pyrrole, 3-hexylthiophene, or 3-thiophene acetic acid (3-TAA) leads to deposition of a polymeric layer of polyaniline (PANi), polypyrrole (PPy), poly(3-hexylthiophene-2,5-diyl) (P3HT), or poly(3-hexylthiophene-2,5-diyl) respectively. Use of a precursor containing PCBM results in deposition of PCBM.

The or a deposition precursor may be or comprise perovskite precursors, for example lead oxide or lead acetate, or precursors of metalorganic framework (MOFs) such as HKUST-1.

For example use of lead acetate with dimethyl sulfoxide or hydrogen peroxide results in deposition of a lead based perovskite. Use of methanol, ethanol, dimethyl sulfoxide and trimesic acid with an aerogel on which copper has already been deposited results in deposition of metal organic framework, e.g. HKUST-1.

The or a deposition precursor is preferably or preferably comprises chloroplatinic acid, manganese acetate, silver nitrate, sodium tungstate dehydrate, lithium perchlorate/copper sulfate, hydrogen tetrachloroaurate(III), tetraamminepalladium(II) chloride monohydrate, aniline or pyrrole. That is, in preferred embodiments the deposition precursor is at least one selected from chloroplatinic acid, manganese acetate, silver nitrate, sodium tungstate dehydrate, lithium perchlorate/copper sulfate, hydrogen tetrachloroaurate(III), tetraamminepalladium(II) chloride monohydrate, aniline and pyrrole.

In certain embodiments the deposition precursor is or comprises a salt of platinum, for example chloroplatinic acid. In certain embodiments the deposition precursor is or comprises pyrrole.

The concentration of the deposition precursor in the electrolyte solution may suitably be 0.01 to 2 M, preferably 0.05 to 1 M.

Additives such as lithium perchlorate or boric acid may be included in the electrolyte/precursor solution to create a supportive environment for deposition. Other useful additives are known to a person skilled in the art. The concentration of additives may suitably be 0 to 0.2 M, preferably 0.005 to 0.1 M.

Preferably the deposited material is a platinum group metal (PGM, including ruthenium, rhodium, palladium and platinum) for example platinum, manganese oxide, silver, tungsten oxide, copper, polyaniline or polypyrrole. Accordingly preferred deposition precursors are salts of platinum, manganese, silver, tungsten or copper; salts of oxides thereof; aniline; and pyrrole.

Figure 2:
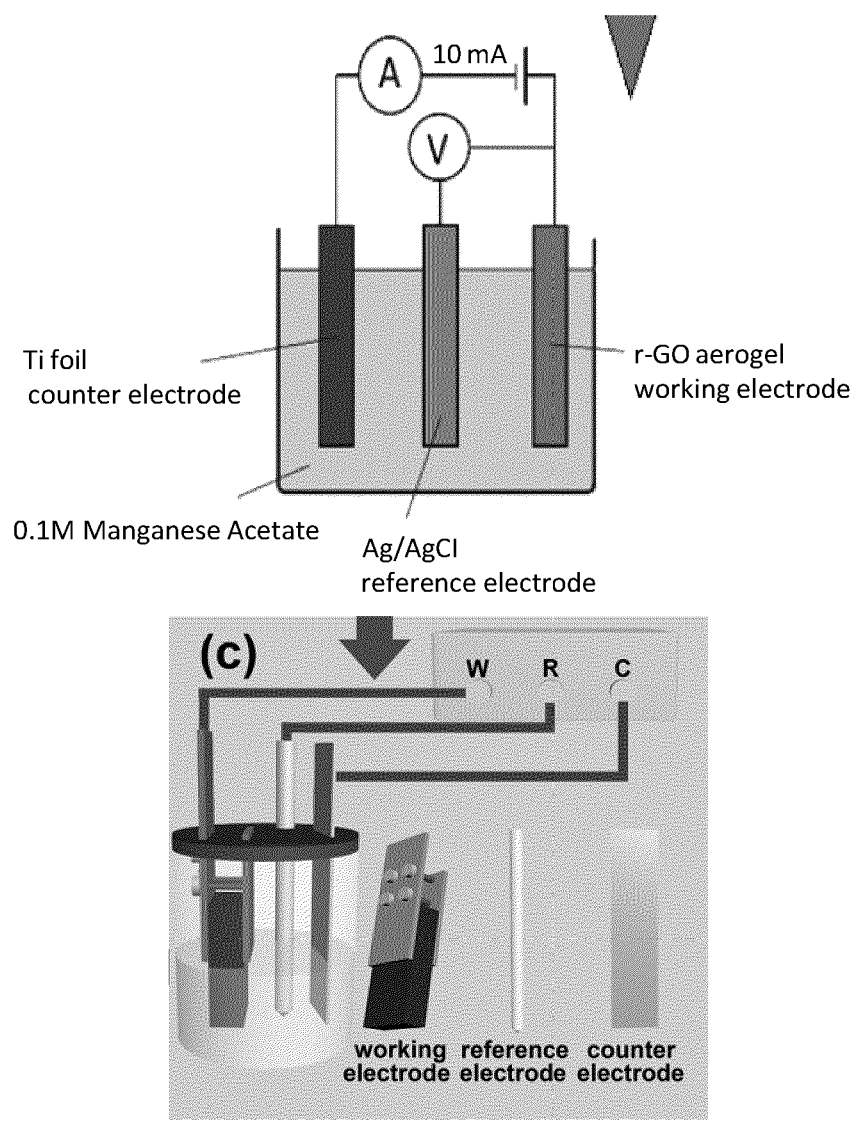
FIG. 2 shows a standard three electrode set up for electrodeposition with a reduced graphene aerogel as the working electrode.

Electrolysis is used to deposit material on the aerogel. Suitably, pulse deposition is used, however non-pulsed deposition may also be used. Use of pulse deposition can enable single atom deposition. A standard three electrode set up may be used comprising a working electrode, counter electrode and reference electrode (FIG. 2), along with an electrolyte solution. The electrolyte soaked aerogel is used as the working electrode. The counter electrode may be, for example, a platinum mesh counter electrode. The reference electrode may be, for example Ag|AgCl|KCl(sat.). The electrolyte solution is suitably the same as was used to infiltrate into the water soaked aerogel as explained above. Other electrodeposition arrangements will be apparent to those working in this technical field. For example, a two electrode set up may be used comprising a working electrode, for which the electrolyte soaked aerogel is used, and a counter electrode, for example a platinum mesh counter electrode, along with an electrolyte, which may be the same as was used to infiltrate into the water soaked aerogel as explained above.

Figure 3:
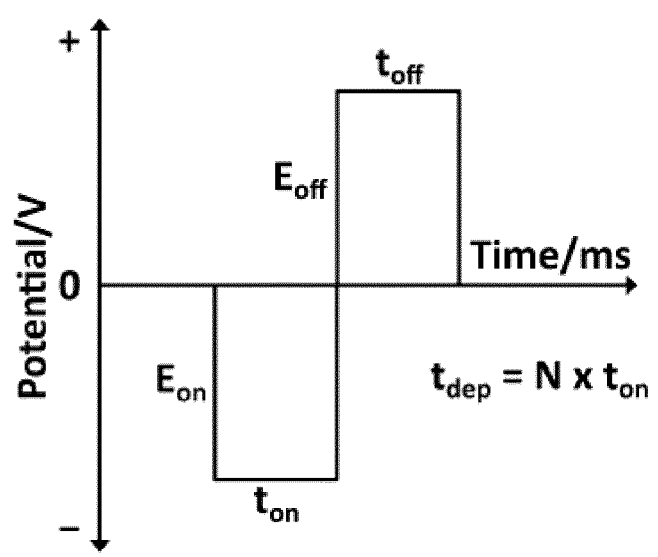
FIG. 3 shows an example pulse cycle.

An example pulse cycle is shown in FIG. 3. The deposition occurs when voltage ($E_{on}$) is applied during an "on" time ($t_{on}$). Then an $E_{off}$ voltage is applied for an "off" time ($t_{off}$). $E_{off}$ may be 0V or it may be a voltage of lower, or opposite potential to $E_{on}$. This cycle is repeated until the total desired deposition time ($t_{dep}$) is achieved. $t_{on}$ and $t_{off}$ may be the same or different.

By the method of the present invention, many different micromorphologies are possible. The size of the deposited material may be single atoms or molecules, nanoclusters or nanoparticles, for example 100 nm clusters or 1 μm clusters, or any other desirable size of clusters. By the methods of the present invention, the deposited material may be present throughout the aerogel, with the clusters, particles, atoms or molecules dispersed broadly homogenously on its surfaces. As required, the conditions of the electrodeposition may be varied to deposit single atoms or molecules, nanoparticles or nanoclusters, or to deposit a precise thickness of polymeric layer or any other size of material clusters. These factors may be controlled by, for example, the number of pulse cycles, the length of "on" time, or the voltage. A suitable number of pulse cycles is 1 to 500. A suitable length for $t_{on}$ for each pulse is 1 to 30 seconds, preferably 5 to 25 seconds, preferably 10 seconds. For small samples, for example up to 10 cm$^3$, a suitable voltage for $E_{on}$ is −3 to 3 V. When non-pulsed deposition is used the total deposition time may suitably be 1 to 120 mins, for example, 30 to 60 mins. It is appreciated that the exact parameters of the deposition can be modified based on the aerogel substrate, deposition precursor used and the desired outcome. It will be appreciated that larger samples may require a higher voltage.

It will be apparent that single atom or molecule deposition is not possible with known methods of synthesis, such as a sol-gel method, since they do not use an electrodeposition but instead rely on a (dispersed but particulate/agglomerated) deposition material naturally 'falling' into its finally position. That is, these methods allow no control of the size of deposit formed—the structure formed is based on chance.

The electrolyte solution (also sometimes referred to as the electrodeposition plating solution) is preferably stable at ambient temperatures and can be reused for multiple samples. Post electrodeposition, the sample (that is, the aerogel onto which material has been deposited) may be washed, suitably with deionized water, and dried. The aerogel is suitably dried by oven drying, vacuum oven drying or lyophilizing. A suitable temperature for drying is 20 to 40° C. This can afford the composite materials of the present invention, comprising a 2D-material based aerogel with material deposited thereon. The deposition may preferably be homogeneous on the internal and external surfaces of the aerogel. That is, the material may be deposited evenly throughout, on, in or over the surface(s) of the pores of the aerogel.

This means deposition occurs within the pores of the aerogel, throughout the porous structure due to the infiltration of the deposition precursor through it. Such substantially homogeneous deposition, with the deposited material spread evenly, is not possible using techniques such as a sol-gel method, wherein in-homogeneities arise during manufacturing.

Depending on what material was deposited, a product of the present invention can have many uses. For example, when platinum is deposited the material may be used as a catalyst in a fuel cell, hydrogen evolution reaction, or other chemical reactions. Deposition of manganese oxide is useful for batteries. Deposition of silver is useful in biomedical fields. Deposition of tungsten oxide is useful as an optical catalyst for reactions such as water splitting, as a supercapacitor, gas sensor or for $CO_2$ reduction. Depositing calcium oxide forms a calcium oxide-aerogel composite with high surface area and porosity that can be used as a medium for carbon capture/sequestration. Deposition of PCBM or poly(3-hexylthiophene-2,5-diyl) leads to materials useful for photovoltaics. Deposition of aluminium oxide leads to a useful structural composite. Deposition of copper leads to materials useful for high voltage conductor applications. Deposition of polyaniline is useful for chemical sensors and high voltage shielding. Deposition of polypyrrole may be used for thermal regulation. The present invention therefore provides use of the aerogels defined herein in those applications, where the appropriate material is deposited. For example, the invention provides use of a 2D-material based aerogel as described herein, having platinum deposited thereon, in a fuel cell; it also provides a fuel cell comprising such a 2D-material based aerogel having platinum deposited thereon.

Where the deposited material is catalytic in its intended use, it may be preferable for it to be deposited at least partially as single atoms or molecules as described herein. This applies to, for example, platinum deposition.

Figure 4:
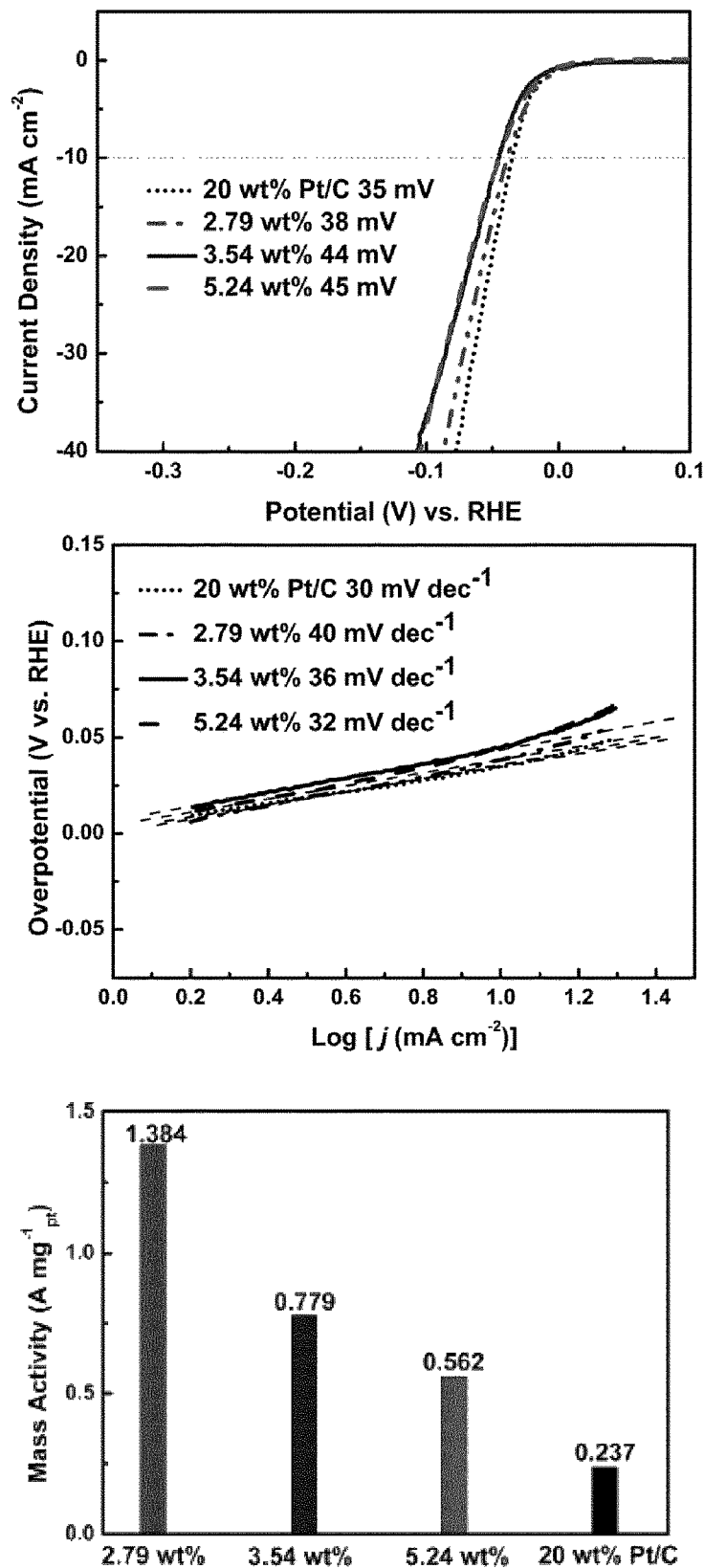
FIG. 4 shows comparison of Pt/reduced graphene oxide catalyst with varying wt % against a commercial Pt/C catalyst.

In particular, deposition of platinum may be used to catalyse the hydrogen evolution reaction (HER). A platinum/graphene catalyst according to the present invention with a platinum loading of 2.79 wt % was able to achieve similar activity compared to a commercial platinum on carbon catalyst with a loading of 20 wt % platinum (FIG. 4). The mass activity of the platinum catalyst according to the present invention with 2.79% loading was higher than that of the commercial catalysts. This is due to the single atom deposition which increases the active surface area of the platinum, enabling a lower amount of platinum to be used to achieve the same results.

The present invention may therefore in some embodiments relate to a graphene or reduced graphene oxide aerogel having platinum deposited thereon (therein; on the surfaces of its pores), the platinum being loaded at 1-8 wt %, for example 1-4 wt %, 2-4 wt %, 2.2-3.7 wt %, or 2.5-3 wt %; and preferably being substantially deposited as single atoms.

The loading of platinum for a given material can be found by dissolving a sample in nitric acid, after having weighed the sample. This leads to the platinum dissolving. The aerogel material (for example reduced graphene oxide) and the solution are separated. Then the content of platinum in the nitric acid can be measured. This gives a weight/mass of platinum that was loaded. Using this value and the mass of the sample before dissolving, the wt % loading can be found.

The loading of platinum on the aerogel can also be considered in terms of weight per $cm^2$ of the aerogel area in a standard rotating disk electrode apparatus. Such an apparatus is well known and used for testing, for example, a material's performance in hydrogen evolution reaction, oxygen reduction reaction and oxygen evolution reaction. Such an apparatus is described in, for example, "Rotating Electrode Methods and Oxygen Reduction Electrocatalysts", Elsevier, 2014, edited by Wei Xing, Geping Yin and Jiujun Zhang, pp. 171-198, chapter 5 "Rotating Disk Electrode Method". In the testing apparatus there is a test electrode (disk electrode) of a fixed size (circular with diameter=5 mm) where the sample of material to be tested is placed. The area of that electrode, combined with the calculated platinum loading of the aerogel, can be used to find the loading weight per $cm^2$ of the electrode. The thickness of the sample is <10 μm, and thus can effectively be ignored when considering the size of the sample.

Thanks to the present invention, it may be significantly lower than usual in the art, for example 0.003-0.01 mg platinum/$cm^2$, or 0.005-0.008 mg platinum/$cm^2$.

The weight of platinum can be found by dissolving the sample in nitric acid. This leads to the platinum dissolving. The aerogel material (for example reduced graphene oxide) and the solution are separated.

Then the content of platinum in the nitric acid can be measured. This gives a weight/mass of platinum that was loaded.

An aerogel of such a type may be useful as an electrode in a fuel cell.

Figure 7:
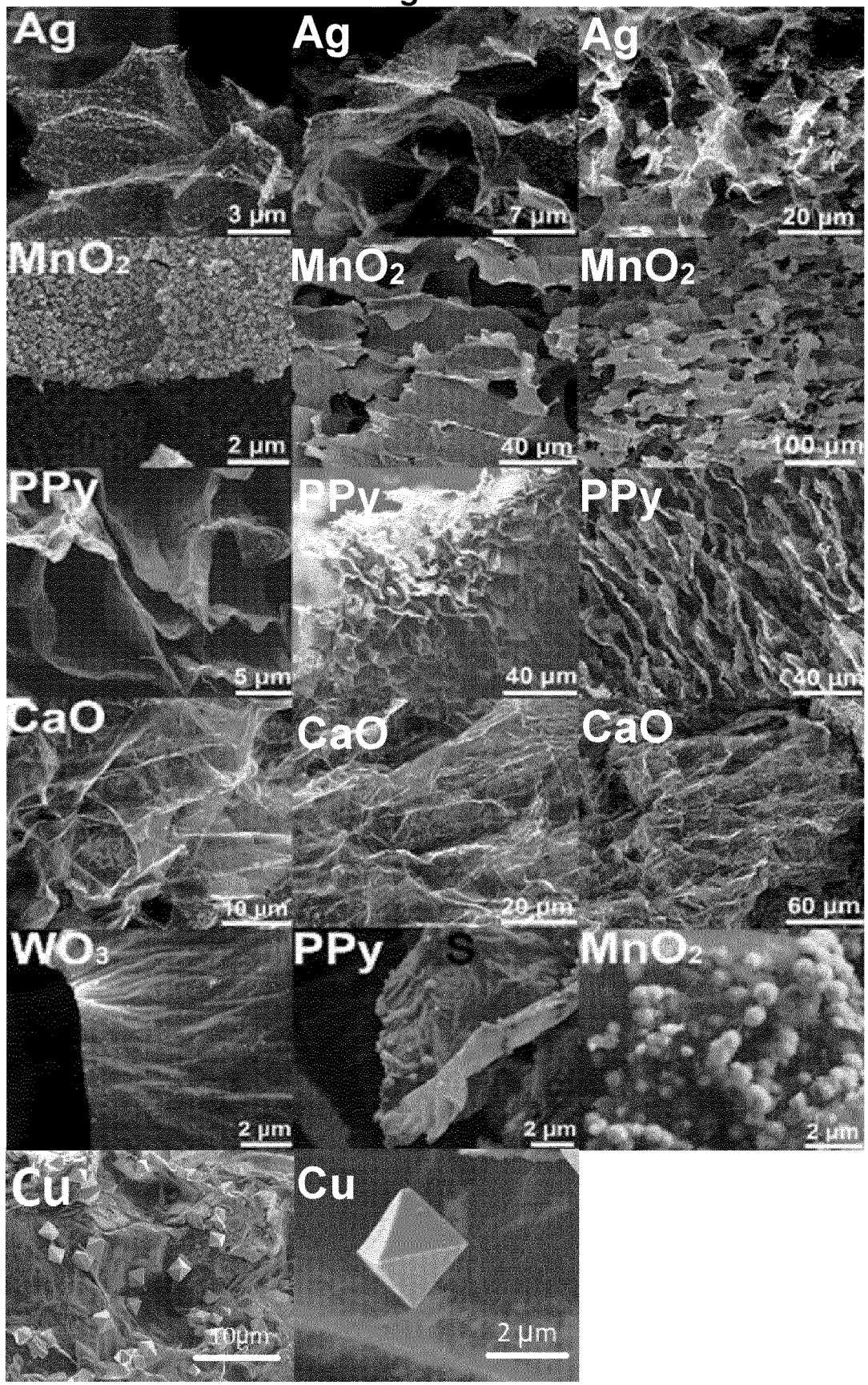
FIG. 7 shows SEM images of graphene aerogels with deposited silver, manganese oxide, polypyrrole, calcium oxide, tungsten oxide and copper.

FIG. 7 shows SEM images of some other materials deposited on aerogels, at varying levels of magnification If required, the aerogel prepared according to the present invention can be broken down and dispersed in a solvent, suitably by sonication. This process breaks down the 2D-material based support, and forms smaller pieces of the aerogel while retaining the deposited material on its surfaces. Suitably, the solvent is a mixture of water and an organic solvent, for example water and an alcohol such as isopropanol. This can enable the composite material to be used to coat other objects, for example a glassy carbon electrode.

It will be appreciated that, after deposition, a 'repeat' of the method of the present invention can be performed to deposit a second material which may the same as or different from the first deposited. For example, a first conduction of the method may for an aerogel impregnated with platinum or polypyrrole (that is, having platinum or polypyrrole deposited thereon and therein). That impregnated aerogel may then be used as the starting material for a second conduction of the method, to deposit a further amount of platinum or polypyrrole. For example, an aerogel having copper deposited thereon may undergo a further deposition according to the present invention using methanol, ethanol, dimethyl sulfoxide and trimesic acid to deposit metal organic framework e.g. HKUST1.

That is, the 2D-material based aerogel used in step (a) of the present methods is not necessarily a 'naked' aerogel; it may already have some material (different from the aerogel material) already deposited upon it.

Of course the deposition precursors and deposited materials discussed herein can be used in various combinations in such repeated depositions. This enables multi-functional aerogels to be synthesised.

\*\*\*

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

EXAMPLES

Materials Characterisation

The surface morphology images, and chemical composition of the as-prepared samples were acquired by scanning electron microscope (SEM, TESCAN Mira3 LC) with an energy dispersive spectroscopy (EDX) microprobe. Transmission electron microscopy was performed on a FEI Titan G2 80-200 S/TEM microscope operated at an accelerating voltage of 200 kV, and aberration-corrected STEM images were taken using a 200 kV JEM-ARM200F equipped with double spherical aberration correctors. The PerkinElmer Optima 7300 DV ICP-AES instrument was used to determine the content of Pt loading after digesting the powdered sample in $HNO_3$. XPS measurements were carried out on a Thermal VG Scientific ESCALAB250 spectrometer equipped with an Al anode (Al K$\alpha$=1,486.7 eV). All the spectra were corrected with respect to the C 1s peak at 284.8 eV. The XPSPEAK 4.1 software was used for the deconvolution of XPS spectra. X-ray diffraction patterns were recorded by using a Rigaku Smartlab instruments equipped with Cu K$\alpha$ radiation ($\lambda$=1.54178 Å). Powder X-ray diffraction was undertaken using a Proto AXRD $\theta$-2$\theta$ diffractometer (284 mm diameter circle) with sample spinner and Dectris Mythen 1K (5.01° active length) 1D-detector in Bragg-Brentano geometry employing a Copper Line Focus X-ray tube with Ni k$\beta$ absorber (0.02 mm; K$\beta$=1.392250 Å) K$\alpha$ radiation (K$\alpha$1=1.540598 Å, K$\alpha$2=1.544426 Å, K$\alpha$ ratio 0.5, K$\alpha$av=1.541874 Å) at 600 W (30 kV 20 mA). Raman spectra were performed on a Horiba LabRamHR system combined with a 633 nm laser. The 3D tomographic images exhibited voxel size of 2.6 micrometers and the spatial resolution of 10 micrometers (Zeiss VersaXRM520). Ultra high resolution 3D tomographic images were obtained using Zeiss UltraXRM and it had spatial resolution of 40 nm.

Example 1

GO Synthesis

Graphene Oxide (GO) flakes were produced from large particle size graphite powder using a liquid phase exfoliation procedure based on a modified Hummers method. 4.50 g of graphite flakes (grade 9842, Graphexel Ltd., Epping, UK) was dispersed in 600 ml concentrated sulfuric acid (>95%, >17.7 mol, Fisher Scientific, Loughborough, UK) using a mechanical stirrer and cooled in an ice bath. Subsequently, 4.50 g $KMnO_4$ (Sigma-Aldrich, Gillingham, UK) was added slowly over approximately 20 min, the mixture was allowed to warm to room temperature and continuously stirred for approximately 1 day to consume the $KMnO_4$ (green colour diminished). The mixture was cooled in an ice bath and an additional 4.50 g $KMnO_4$ was slowly added. A total of 4 $KMnO_4$ aliquots were added individually over 4 days. During oxidation, the mixture was continuously stirred at room temperature except during the addition of $KMnO_4$ (roughly 20 mins each time). 24 hours after the final $KMnO_4$ addition, the mixture became viscous with the graphite almost fully oxidised to GO. The viscous mixture was slowly dispersed in an ice-water mixture (1000 ml) and $H_2O_2$ solution (35%, 18 ml) was added drop by drop until effervescence stopped, the mixture became light-yellow and was continuously stirred for 2 hours. The product was centrifuged at 8000 rpm for 30 mins to separate the GO from the acid solution. The GO precipitate was re-dispersed with HCl solution (5%, 1000 ml) and centrifuged at 8000 rpm for 30 min. The precipitate was repeatedly washed with water (1000 ml) and concentrated via centrifugation (discarding the colourless supernatant) until the pH of the supernatant was about 6 (9-10 washing cycles). The resulting dark brown—orange viscous GO liquid was about 10 mg $ml^{-1}$. The final GO dispersion was centrifuged at 3000 rpm for 10 min to remove unexfoliated GO before use.

Example 2

Reduced Graphene Oxide (rGO) Aerogel Synthesis

Graphene oxide suspensions in water with concentration 10 mg $cm^{-3}$ were prepared as in Example 1 and sucrose and polyvinyl alcohol (PVA) were used as additives (the GO:additive ratio was 1:1 in weight). The slurry was subsequently freeze-casted at a rate of 5 K $min^{-1}$ using a freeze casting plate (instec) and freeze dried in a Labconco FreeZone 4.5 L console. The scaffolds obtained were reduced at 800° C. for 40 mins in Argon atmosphere inside a tubular oven (carbolite).

Example 3

Hybrid Materials Production

Ethanol was infiltrated into the pores of the rGO aerogel, prepared as in Example 2, by submerging the aerogel (a mass was used to keep it submerged). Thereafter the ethanol impregnated aerogel was washed repeatedly with deionized (DI) water by submerging it in DI water. After about 4-5 times, the aerogel is not infiltrated with any more DI water. The water impregnated aerogel was placed in an aqueous electrolyte solution of 10 mM $H_2PtCl_6.6H_2O$ and 5 mM $LiClO_4$ and the ions naturally diffused into the pores of the aerogel.

Pt-decorated rGO aerogels were prepared using a standard three-electrode setup that consisted of rGO aerogel as the working electrode, platinum mesh counter electrode (Alfa Aesar, 99.9999%), and Ag|AgCl|KCl(sat.) reference electrode (0.197 V versus SHE). All deposition potentials are reported versus the Ag|AgCl|KCl(sat.) reference electrode unless stated otherwise. Pulse electrochemical deposition was done using a plating solution containing 10 mM $H_2Pt(OH)_6$+5 mM $LiClO_4$. The electrodeposition plating solution is stable at ambient temperatures and can be reused for multiple samples. Here, the inventors applied this electrodeposition to deposit Pt on an aerogel sample with dimensions of 1.5 cm by 0.5 cm by 3 cm; A voltage of −1 V, $E_{on}$, was applied during the "on" time, $t_{on}$, for 10s, followed by an $E_{off}$ pulse ($E_{off}$=0 V) for $t_{off}$ of 10s. The on and off cycles were repeated until the desired deposition time ($t_{dep}$) was achieved. In this example $t_{dep}$=20 s. The deposition time is based on the number of pulses (N) that the potential, $E_{on}$, is applied to the working electrode for the time $t_{on}$. The total time in which Pt reduction occurs is then given by $t_{dep}$=N×$t_{on}$, while the total time needed for the entire pulsed deposition process is given by $t_{total}$=N×($t_{on}$+$t_{off}$). Post electrodeposition, the samples were washed with deionized water and dried.

Figure 5:
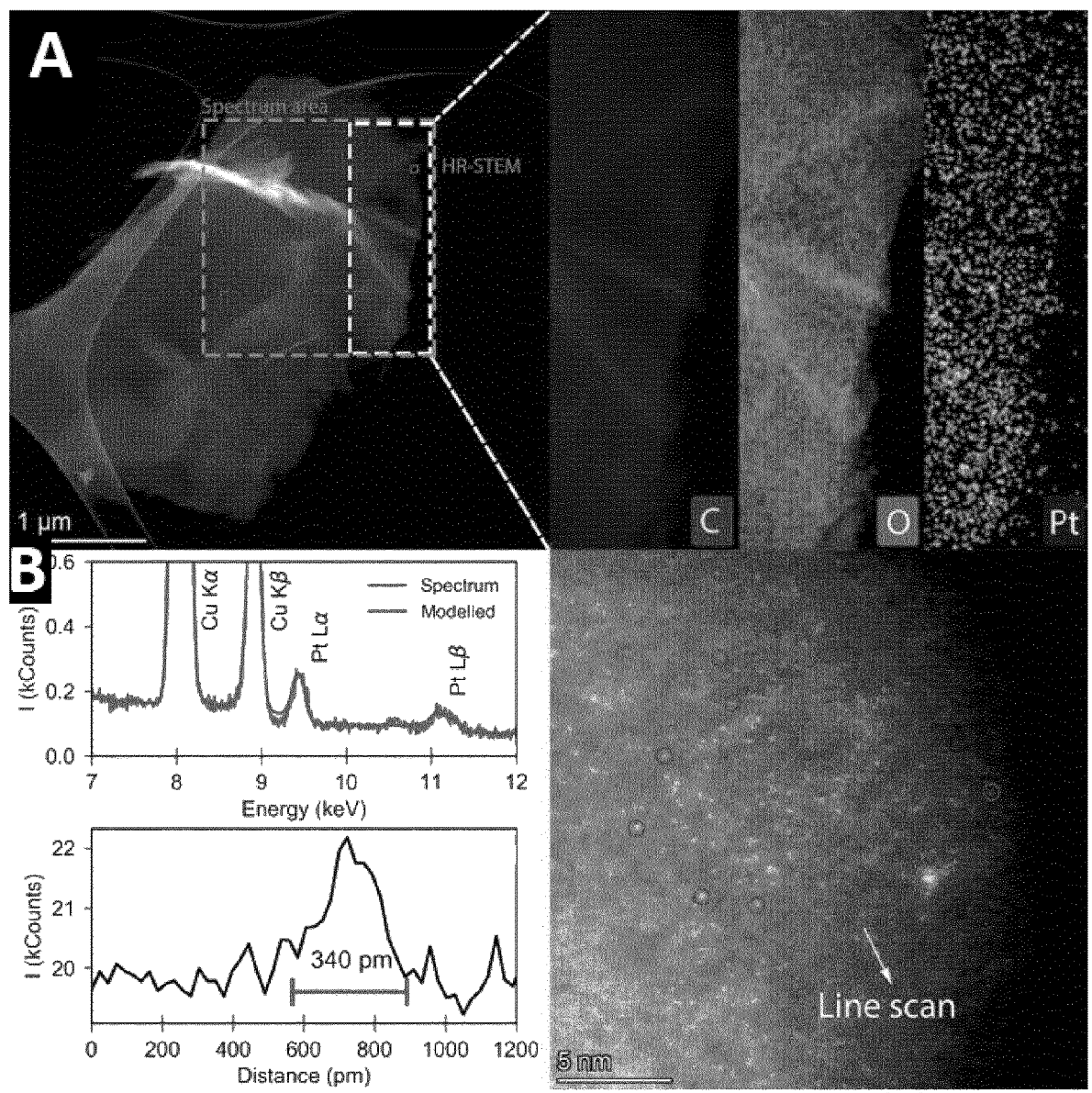
FIG. 5 shows A) HAADF-STEM image of particles for mapping. Element mapping images of C, O, Pt with their overlapping images. B) STEM line scan, mapping size of single atom of platinum.

This resulted in a rGO supported platinum catalyst with 2.79 wt % Pt. To identify the form of the Pt atoms distributed on rGO supports, high-angle annular dark-field scanning transmission electron microscopy (HAADF-STEM) was used. Isolated Pt atoms (named as Pt/rGO) were observed all over the support (FIG. 5)

HER/Electrochemical Characterization, Linear Sweep Voltammetry

To fabricate the working electrode, 50 pg of each catalyst with 50 µl of 5 wt % Nafion solution (Sigma-Aldrich) was dispersed in 1 ml of a water/isopropanol mixed solvent (1:1 volume ratio) by several hours of sonication to form a homogeneous ink. A glassy carbon disk served as the working electrode to drop the catalyst ink on the surface, which resulted in a catalyst loading of 510 µg cm$^{-2}$ (calculated by the total weight) for all electrochemical tests. Note that the glassy carbon disk electrode of the RDE is 5 mm in diameter, whereas a rotating ring-disk electrode (RRDE) electrode (which contains a Pt ring with a 6.25 mm inner diameter and 7.92 mm outer diameter) is 5.61 mm in diameter. The electrochemical measurements were carried out on a CHI 660E workstation (the RRDE measurement was performed with an Autolab PGSTAT 302N potentiostat) with a rotation control (MSR (Pine Instruments)) using a conventional three-electrode cell in 0.5 M $H_2SO_4$ at room temperature. For the counter electrode, a graphite rod was used. An Ag/AgCl electrode (saturated KCl) was used as the reference electrode, which was calibrated with respect to the reversible hydrogen electrode (RHE) under the high purity hydrogen-saturated electrolyte with a Pt mesh as the working electrode. The RDE/RRDE measurements were performed in $N_2$-saturated electrolyte at 2,000 revolutions per minute with a sweep rate of 5 mV s$^{-1}$ to remove the generated gas bubbles. To detect the hydrogen evolution at the disk electrode, the potential of the Pt ring electrode in the RRDE system was set to 1.2 V (versus RHE). Electrochemical impedance spectroscopy measurements were carried out at an overpotential of $\eta=0$ mV or 30 mV, with a 5 mV a.c. potential from 0.1 to 105 Hz. An accelerating stability measurement was evaluated using 6,000 continuous cycles from −0.05 to 0.2 V (versus RHE) at a scan rate of 50 mV s$^{-1}$. The time-dependent current density curve was collected by loading catalyst ink onto carbon paper (1 cm×1 cm TGP-H-60 (Toray)) and the overpotential maintained at an $\eta$ of 40 mV for 100 h.

Compared to the conventional bulk or graphene-supported Pt catalysts, Pt particles with rGO acting as support enable the integration of an efficient charge delivery and a strong local electric field effect for Pt/rGO electrocatalysts. The optimized electrocatalyst, using only 2.79 wt % Pt, achieved a comparable HER rate to that of the commercial Pt/C catalyst (20 wt % Pt) and a better rate than that of graphene-supported catalyst with a similar Pt loading (FIG. 4).

REFERENCES

A number of publications are cited above in order to more fully describe and disclose the invention and the state of the art to which the invention pertains. Full citations for these references are provided below. The entirety of each of these references is incorporated herein.

The invention claimed is:

1. A method for producing a composite material, comprising the steps of
   (a) impregnating a 2D-material based aerogel with an impregnation solvent, to form a solvent impregnated aerogel;
   (b) performing a solvent/water exchange by washing the solvent impregnated aerogel with water, to replace impregnation solvent with water and form a water impregnated aerogel;
   (c) performing precursor diffusion by contacting the water impregnated aerogel with an electrolyte solution containing a deposition precursor, to form a precursor impregnated aerogel;
   (d) passing a current through a cell comprising the precursor impregnated aerogel as a working electrode.

2. A method according to claim 1, wherein the 2D-material based aerogel is selected from a graphene aerogel, graphene oxide aerogel, a reduced graphene oxide aerogel, a carbide aerogel, and a transition metal dichalcogenide aerogel.

3. A method according to claim 1, wherein the impregnation solvent is selected from methanol, ethanol, 1-propanol, isopropanol, n-butanol, formic acid, acetone, dimethylformamide and dimethylsulfoxide.

4. A method according to claim 1, wherein the electrolyte solution is aqueous.

5. A method according to claim 1, wherein the deposition precursor is a salt.

6. A method according to claim 1, wherein the deposition precursor is selected from a salt of platinum, a salt of manganese, a salt of silver, a salt of tungsten, a salt of copper, aniline and pyrrole.

7. A method according to claim 1, wherein the deposition precursor is selected from chloroplatinic acid, manganese acetate, silver nitrate, sodium tungstate dehydrate, lithium perchlorate/copper sulfate, hydrogen tetrachloroaurate (III), tetraamminepalladium (II) chloride monohydrate, aniline and pyrrole.

8. A method according to claim 1, wherein the current is passed in pulses.

* * * * *